(12) United States Patent
Welch et al.

(10) Patent No.: US 6,602,603 B2
(45) Date of Patent: Aug. 5, 2003

(54) POLY(METH)ACRYLIC PHOTOCHROMIC COATING

(75) Inventors: Cletus N. Welch, Massillon, OH (US); Robert W. Walters, Export, PA (US); David T. McKeough, Gibsonia, PA (US); Eric M. King, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 134 days.

(21) Appl. No.: 09/946,386

(22) Filed: Sep. 4, 2001

(65) Prior Publication Data

US 2002/0076549 A1 Jun. 20, 2002

Related U.S. Application Data

(63) Continuation-in-part of application No. 09/345,028, filed on Jul. 2, 1999, now abandoned.

(51) Int. Cl.[7] ................................................ G02C 7/02
(52) U.S. Cl. ...................... 428/412; 428/520; 428/522; 351/166
(58) Field of Search ................................ 428/412, 520, 428/522; 351/166

(56) References Cited

U.S. PATENT DOCUMENTS

| | | | |
|---|---|---|---|
| 4,306,780 A | 12/1981 | Tarumi et al. | 351/159 |
| 5,442,022 A | 8/1995 | Keita et al. | 526/309 |
| 5,545,828 A | 8/1996 | Keita et al. | 526/72 |
| 5,621,017 A | 4/1997 | Kobayakawa et al. | 522/16 |
| 5,739,243 A | 4/1998 | Herold et al. | 526/325 |
| 5,776,376 A | 7/1998 | Nagoh et al. | 252/586 |
| 5,804,301 A | 9/1998 | Curatolo | 428/352 |
| 5,910,516 A | 6/1999 | Imura et al. | 522/39 |
| 5,914,174 A | 6/1999 | Gupta et al. | 428/174 |
| 6,025,026 A | 2/2000 | Smith et al. | |
| 6,042,737 A | 3/2000 | Basil et al. | |
| 6,060,001 A | 5/2000 | Welch et al. | 252/586 |
| 6,150,430 A | 11/2000 | Walters et al. | |
| 6,187,444 B1 | 2/2001 | Bowles, III et al. | 428/423.1 |
| 6,268,055 B1 | 7/2001 | Walters et al. | |
| 2002/0009599 A1 * | 1/2002 | Welch et al. | 428/423.1 |

FOREIGN PATENT DOCUMENTS

| | | |
|---|---|---|
| EP | 0846708 A2 | 6/1998 |
| JP | 96/37573 A1 | 5/1995 |
| WO | WO 95/10790 | 4/1995 |
| WO | WO 96/18926 | 6/1996 |
| WO | WO 96/19741 | 6/1996 |
| WO | WO 97/03373 | 1/1997 |
| WO | WO 97/06944 | 2/1997 |
| WO | WO 97/21122 | 6/1997 |
| WO | WO 97/27223 | 7/1997 |
| WO | WO 98/37115 | 8/1998 |

OTHER PUBLICATIONS

"Optimized Cure Efficiency Using a Fluorone Visible Light Photoinitiator and a Novel Charge Transfer Complex Initiating System", presented at RADTECH Conference, May, 1996 by A.M. DeRaafe et al.

* cited by examiner

Primary Examiner—D. Lawrence Tarazano
(74) Attorney, Agent, or Firm—Frank P. Mallak

(57) ABSTRACT

Described are articles having a photochromic poly(meth) acrylic coating The coatings exhibit a Fischer microhardness of from 50 to 150 Newtons per $mm^2$ and improved photochromic performance properties, i.e., the formation of darker activated colors and faster rates of photochromic activation and fade when irradiated with ultraviolet light.

22 Claims, No Drawings

POLY(METH)ACRYLIC PHOTOCHROMIC COATING

CROSS REFERENCE TO RELATED APPLICATIONS

This application is a continuation-in-part of application Ser. No. 09/345,028 filed Jul. 2, 1999 now abandoned.

DESCRIPTION OF THE INVENTION

The present invention relates to coatings prepared from poly(meth)acrylic polymer(s) that contain photochromic compound(s), hereinafter referred to as photochromic poly (meth)acrylic coatings, and articles to which such coatings have been applied. More particularly, this invention relates to photochromic poly(meth)acrylic coatings which when applied to a substrate exhibit a particular Fischer microhardness and when exposed to activating light radiation exhibit improved photochromic performance properties, i.e., the formation of darker activated colors and faster rates of photochromic activation and fade. Further, this invention relates to photochromic poly(meth)acrylic coatings that meet commercially acceptable "cosmetic" standards for optical coatings applied to optical elements, e.g., lenses.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

The use of photochromic compounds in combination with polymerizates of poly(meth)acrylates has been disclosed. For example, a process for producing photochromic products from a composition of radically polymerizable monomers, ultraviolet light initiators and photochromic compounds is described in International Patent Publication WO 96/37593. A photochromic composition comprising radically polymerizable monomer, from 0.001 to 0.2 weight percent of a photochromic compound and a photopolymerization initiator is disclosed in U.S. Pat. No. 5,621,017. In U.S. Pat. No. 5,776,376, a photochromic composition comprising a polymerizable monomer having at least one epoxy group, certain (meth)acrylate and di(meth)acrylate monomers and photochromic compounds is described.

A polymeric material of mono or multi-functional (meth) acrylates, which has a glass transition temperature of at least 125° F. and a cross link density of from 2 to 8 moles per liter (M/L), is disclosed as a carrier of photochromic additives in WO 97/06944. European Patent Publication EP 846708 A2, describes a resin comprising at least two polymerizable (meth)acrylate monomers, at least one photochromic compound, an additive and polymerization initiator. The resultant polymerizate is described as having a glass transition temperature ranging from 20 to 50° C. and a cross link density ranging from 0.5 M/L to 3 M/L. Photochromic polymeric materials prepared from ethoxylated bisphenol A dimethacrylate alone or in combination with other monomers are disclosed in WO publications 96/18926, 96/19741, 97/03373 and 97/21122.

The use of poly(meth)acrylic polymers in the preparation of non-photochromic low yellow index polymer compositions and optical lenses has been disclosed. An ophthalmic lens prepared from the polymerization of a composition comprising at least 50% by weight of an ethoxylated bisphenol A dimethacrylate type monomer having 0 to 10 ethoxy units is disclosed in U.S. Pat. Nos. 5,545,828 and 5,442,022. A high refractive index lens obtained by copolymerization of an ethoxylated bisphenol A dimethacrylate type monomer having 0 to 8 ethoxy units is described in U.S. Pat. No. 4,306,780.

The above patents and patent applications do not disclose an article comprising, in combination, a substrate and a photochromic coating applied to at least one surface of the substrate, the coating exhibiting good photochromic properties and being prepared from a composition comprising from 0.1 to 40.0 weight percent of a photochromic component, at least two difunctional (meth)acrylate monomers, each having from greater than 3 to less than 15 alkoxy units, in a specific weight ratio and a polymerization initiator. The coating is free of chain transfer agents, also referred to as cure modifiers which are typically found in polymerizable compositions used to form articles such as lenses.

In terms of photochromic properties, the herein described photochromic poly(meth)acrylic coatings color and fade at acceptable rates, and achieve a satisfactory activated colored state. The novel coatings described herein also exhibit a Fischer microhardness of from 50 to 150 Newtons per $mm^2$. Such a hardness level enables the cured coating to be handled and coated, e.g., with an abrasion-resistant coating, without causing cosmetic defects, e.g., pits, spots, cracks, inclusions, etc.

DETAILED DESCRIPTION OF THE INVENTION

In recent years, photochromic articles, particularly photochromic plastic materials for optical applications, have been the subject of considerable attention. In particular, photochromic ophthalmic plastic lenses have been investigated because of the weight advantage they offer, vis-à-vis, glass lenses. Moreover, photochromic transparencies for vehicles, such as cars and airplanes, have been of interest because of the potential safety features that such transparencies offer.

The use of photochromic coatings enables the preparation of photochromic plastic articles without the need to incorporate the photochromic compound(s) into a preformed plastic substrate. This avoids the need to develop special optical resin materials that may be used with photochromic compounds, and is particularly advantageous when the plastic, e.g., thermoplastic polycarbonate, does not have sufficient internal free volume to allow an incorporated photochromic material to activate. Further, use of photochromic coatings results in a more efficient utilization of photochromic compounds by avoiding losses associated with more conventional transfer methods, e.g., imbibition or permeation.

Other than in the operating examples, or where otherwise indicated, all values, such as those expressing wavelengths, quantities of ingredients, ranges or reaction conditions, used in this description and the accompanying claims are to be understood as modified in all instances by the term "about".

The Fischer microhardness of the coatings described herein range from 50 Newtons per $mm^2$, preferably from 60, more preferably, from 70 Newtons per $mm^2$ to 150 Newtons per $mm^2$, preferably, to 130 and more preferably to 120 Newtons per $mm^2$. The Fischer microhardness of these coatings may range between any combination of these values, inclusive of the recited values, e.g., from 51 to 149 Newton per $mm^2$. The Fischer microhardness values are measured with a Fischerscope H-100 using a 100 milliNewton load, 30 load steps, 0.5 second pauses at an indentor depth of 2 μm, as described in more detail in Part E of Example 19 herein.

The photochromic properties of the cured coatings of the present invention are characterized by a change in optical density (ΔOD) after 30 seconds of at least 0.15, preferably, at least 0.17 and most preferably, at least 0.19; and a ΔOD after 15 minutes of at least 0.50, preferably, at least 0.60, and most preferably, at least 0.70; and a bleach rate of not more than 200 seconds, preferably, not more than 190, and most preferably, not more than 180 seconds—all as measured at 22° C. (72° F.), and as described in more detail in Part G of Example 19 herein.

The aforedescribed photochromic performance properties of the poly(meth)acrylic coating of the present invention are a function of the temperature at which testing is done and the time intervals selected for determination of those properties. For example, photochromic poly(meth)acrylic coatings within the scope of this invention demonstrate in the 27° C. (81° F.) Photochromic Performance Test defined in Part G of Example 19, a ΔOD of at least 0.20 after 30 seconds and at least 0.50 after eight minutes, and a Bleach rate of less than 150 seconds; preferably a ΔOD of at least 0.22 after 30 seconds and at least 0.55 after eight minutes, and a Bleach rate of less than 145 seconds; and most preferably, a ΔOD of at least 0.24 after 30 seconds and at least 0.60 after eight minutes, and a Bleach rate of less than 140 seconds.

Poly(meth)acrylic coatings having microhardness and photochromic performance properties within the aforestated ranges can be produced by the selection and balancing of the types and amounts of the components of the polymerizable composition used to prepare the coating matrix. For example, the specific properties of the components comprising the coating matrix that will effect the microhardness and photochromic performance properties of the poly(meth)acrylic matrix are the glass transition temperature and molecular weight of the components and the crosslink density of the resultant matrix. Generally, using components having higher glass transition temperatures and molecular weights results in coatings and polymerizates having an increased microhardness and vice versa. An increase in the number of reactive groups of a component will also cause an increase in the microhardness, provided that all of the groups are reacted. In this latter case, an increase in the number of reactive groups, i.e., crosslinking sites, increases the crosslinked density of the cured coating. It is believed however that the harder the coating or polymerizate the slower the activation and bleaching of the photochromic compound(s) contained therein.

The contribution of a particular polymerizable component, to either the hardness or softness of the cured poly(meth)acrylic coating can be readily determined by measuring the Fischer microhardness of the poly(meth)acrylic coating that is prepared using that component. The hardness-producing monomer component, as defined herein, is a component that increases the microhardness of the poly(meth)acrylic coating as its concentration increases. Similarly, the softness-producing monomer component, as defined herein, is a component that decreases the microhardness of the poly(meth)acrylic coating as its concentration increases. Examples of hardness-producing monomer components include, but are not limited to, (meth)acrylic monomers having from greater than 3 to not more than 9 alkoxy units, e.g., ethoxylated bisphenol A di(meth)acrylate with 4 ethoxy units, and poly(ethylene glycol) dimethacrylate having a number average molecular weight of 330. The softness-producing monomers include, but are not limited to, (meth)acrylic monomers having from greater than 9 to less than 15 alkoxy units, e.g., ethoxylated bisphenol A di(meth)acrylate with 10 ethoxy units, and poly(ethylene glycol)dimethacrylate having a number average molecular weight of 754.

The photochromic coating composition of the present invention may be prepared by combining from 0.1 to 40 weight percent of a photochromic component with at least two difunctional (meth)acrylate monomers, each having from greater than 3 to less than 15 alkoxy units, represented by formulae I and II in a weight ratio of I:II of from greater than 10:90 to less than 90:10, e.g., from 11:89 to 89:11.

The first difunctional monomer may be selected from the group of monomers and mixtures of monomers represented by the following general formula I:

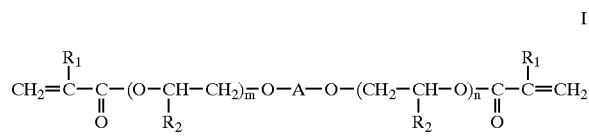

wherein each $R_1$ is hydrogen or methyl, each $R_2$ is hydrogen or $C_1$–$C_2$ alkyl, m and n are each a positive number, the sum of m and n being from greater than 3 and less than 15. The letter A designates a divalent linking group selected from straight or branched chain alkylene (usually containing from 1 to 8 carbon atoms), phenylene or $C_1$–$C_9$ alkyl substituted phenylene.

Linking group A may also be a group represented by the following graphic formula:

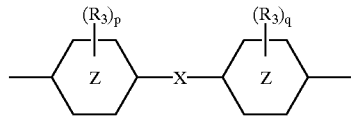

wherein, each $R_3$ is $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$)(C$_6$H$_5$)— or

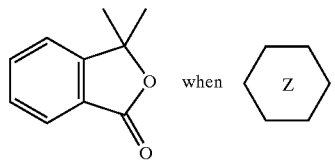

is the divalent benzene group, and X is O, S, —CH$_2$—, or —C(CH$_3$)$_2$— when

is the divalent cyclohexane group.

The second monomer may be selected from the group of monomers and mixtures of monomers represented by the following general formula II:

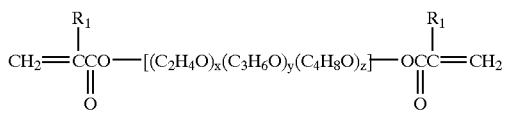

wherein each $R_1$ is hydrogen or methyl, x, y and z are each a number between 0 and less than 15 and the sum of x, y and z is greater than 3 and less than 15. The group, $—(C_2H_4O)_x—$, represents poly(ethylene oxide); $—(C_3H_6O)_y—$ represents poly(propylene oxide); and $—(C_4H_8O)_z—$ represents poly(butylene oxide). When used in combination, the poly(ethylene oxide), poly(propylene oxide) and poly(butylene oxide) groups may be in a random or block order within the second monomer. The sum of x, y and z may be any number that falls within the range of greater than 3 and less than 15, e.g., 4, 5, 6 . . . 14. This sum may also range from any lower number to any higher number within the range of greater than 3 and less than 15, e.g., from 6 to 10, and from 11 to 14. The numbers for x, y, and z are average values and can be partial numbers, e.g., 3.1 or 14.9.

Preferably, the coating comprises two difunctional (meth)acrylate monomers. In the first monomer represented by general formula I, each $R_1$ is methyl, each $R_2$ is hydrogen and the divalent linking group A is represented by the following graphic formula:

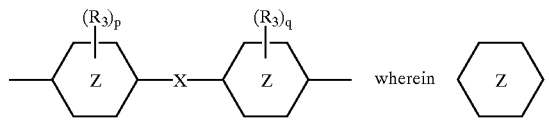

is the divalent benzene group, p and q are each 0, and x is $—C(CH_3)_2—$. The second monomer is represented by general formula II in which each $R_1$ is methyl and x is a number greater than 3 and less than 15, and y and z are 0.

The weight ratio of the monomer(s) selected from the first group of monomer(s) to the monomer(s) selected from the second group of monomer(s), based on the total weight of the monomers, may range from greater that 10:90 to less than 90:10, from 20:80 to 80:20, and from 30:70 to 70:30. The weight ratio of the first monomer to the second monomer of the present invention may range between any combination of these ratios, inclusive of the recited ratios, e.g., from 40:60 to 85:15. The relative proportions of the first and second monomers are selected to achieve the desired photochromic and Fischer microhardness properties described herein.

The first monomer may be prepared by methods which are well known in the art. One such commonly used method involves a two-step process. In the first step, a polyol, e.g., 4,4'-isopropylidenediphenol, is reacted with an oxirane containing substance, for example ethylene oxide, propylene oxide, α-butylene oxide and/or β-butylene oxide to form what is commonly referred to as an ethoxylated, propoxylated and/or butoxylated polyol having hydroxy functionality. The level of alkoxylation can be controlled depending on the amount of oxirane containing substance used in the reaction. In the second step, the ethoxylated, propoxylated and/or butoxylated polyol is esterified, or transesterified, with an alpha-beta unsaturated meth(acrylic) acid or ester such as methacrylic acid, an alkyl methacrylate, acrylic acid, an alkyl acrylate, or a combination thereof. The second step results in the formation of the first monomer.

Polyols that may be used in the first step of preparing the first monomer include: straight chain alkylene glycols such as ethylene glycol, propylene glycol, trimethylene glycol, tetramethylene glycol, or diethylene glycol, triethylene glycol; branched chain alkylene glycols such as 1,2-propanediol, 2-methyl-1,3-propanediol, 1,2-butanediol, 1,3-butanediol, 2,3-butanediol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, 4-hydroxybenzyl alcohol, and 3,5-bis(1,1-dimethylethyl)-4-hydroxybenzenemethanol; dihydroxybiphenyls such as 4,4'-dihydroxybiphenyl and 2,2'dihydroxybiphenyl; bisphenols such as 4,4'-isopropylidenediphenol; 4,4'-oxybisphenol; 4,4'-dihydroxybenzenephenone; 4,4,'-thiobisphenol; phenolphathlalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isoprepylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidenebiscyclohexanol; 4,4'-oxybiscyclohexanol; 4,4'-thiobiscyclohexanol; and bis(4-hydroxycyclohexanol)methane.

The second monomer is a bis[(meth)acryloyl-terminated] polyalkylene glycol monomer which is different than the first monomer. The second monomer is derived from a polyalkylene glycol precursor that results in a monomer having from greater than 3 to less than 15 alkoxy units. Preferably, the second monomer is a polyethylene glycol dimethacrylate that is derived from a polyethylene glycol precursor having a number average modular weight of from 200 to 600, inclusive of the recited range, e.g. 300, 400, 550, etc.

The coating composition of the present invention may also contain from 0 to 10 weight percent, based on the total weight of monomers, of polymerization initiator(s) selected from thermal initiators, photoinitiators or mixtures of such initiators. The coating composition of the present invention is free of chain transfer agents or cure modifiers typically used in casting compositions used to form articles such as lenses By "free of" is meant that the composition does not contain a material in an amount necessary to function as a chain transfer agent, i.e., a material that interrupts the growth of a chain of monomers by forming a new radical that may act as the starting point for a new chain. Examples of chain transfer agents include 2,4-diphenyl-4-methyl-1-pentene, dodecyl mercaptan, butyl mercaptan, diisopropenyl benzene and thiophenol.

Not being bound by any theory, it is believed that chain transfer agents are used in bulk polymerization processes of (meth)acrylates to avoid hot spots in the reaction vessel that could lead to runaway reactions resulting from the Trommsdorff effect. During the curing of the poly(meth)acrylic photochromic coating of the present invention, it is believed that this exothermic reaction assists in the rapid curing of the coating. In the curing of optical elements such as lenses in a mold, chain transfer agents are used to avoid optical distortions such as striations. In general, the prior art teaches the use of chain transfer agents for reasons that appear to be tied to the process of molding three dimensional articles, whereas the present invention deals with thin coatings.

Solvents that may be present in the coating composition are those that are necessary to dissolve and/or disperse the coating components. The minimum amount of solvent present in the coating composition is a solvating amount, i.e., an amount which is sufficient to solubilize the solid components in the coating composition. For example, the amount of solvent present may range from 10 to 80 weight percent based on the total weight of the coating composition.

Suitable solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl) pyrrolidinone, N-(N-dodecyl) pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, mono- and dialkyl ethers of ethylene glycol and their derivatives, which are sold as CELLOSOLVE industrial solvents by Union Carbide, and mixtures of such solvents.

The photochromic poly(meth)acrylic coating composition of the present invention may further comprise additional conventional ingredients which impart desired characteristics to the composition, or which are required for the process used to apply and cure the composition on the substrate or which enhance the cured coating made therefrom. Such additional ingredients may include mono-functional (meth)acrylic monomers, di-functional (meth)acrylic monomers other than those represented by formulae I and II, polyfunctional (meth)acrylic monomers, e.g. trimethylol propane triacrylate, and plasticizers at levels less than 20 weight percent, e.g. at 10 weight percent. The weight percent is based on the total weight of the monomers. The amount of these materials used may range from 0 to less than 20 weight percent.

Other additional ingredients may include light stabilizers, heat stabilizers, mold release agents, rheology control agents, leveling agents, e.g., surfactants, free radical scavengers and adhesion promoting agents, such as the materials used in the process for producing adherent polymeric layers on polymeric substrates which are disclosed in U.S. Pat. No. 6,150,430, which disclosure is incorporated herein by reference. Other adhesion promoters which may be used include trialkoxy silanes, preferably having an alkoxy radical of 1 to 4 carbon atoms, including γ-glycidoxypropyltrimethoxy silane, γ-aminopropyltrimethoxy silane, 3,4-epoxy cyclohexylethyltrimethoxy silane, methacryloxypropyltrimethoxysilane and aminoethyltrimethoxy silane.

Photochromic components that may be utilized in the poly(meth)acrylic coating composition(s) of the present invention are organic photochromic compounds. Such compounds may be used individually or in combination with other complementary photochromic compounds. Organic photochromic compounds or substances containing same used in the coating compositions described herein have at least one activated absorption maxima within the range of between 400 and 700 nanometers; may be incorporated, e.g., dissolved or dispersed, in the (meth)acrylic composition used to prepare the photochromic coating, and color when activated to an appropriate hue.

In one embodiment the organic photochromic component comprises:

(a) at least one photochromic organic compound having a visible lambda max of from 400 nanometers to 525 nanometers; and (b) at least one photochromic organic compound having a visible lambda max of from greater than 525 nanometers to 700 nanometers.

Examples of photochromic compounds that may be used in the poly(meth)acrylic coating composition of the present invention include benzopyrans, naphthopyrans, e.g., naphtho[1,2-b]pyrans and naphtho[2,1-b]pyrans, phenanthropyrans, quinopyrans, benzoxazines, naphthoxazines, spiro(indoline)pyridobenzoxazines and indeno-fused naphthopyrans, such as those disclosed in U.S. Pat. No. 5,645,767. Specific examples include the novel naphthopyrans of U.S. Pat. No. 5,658,501 and the complementary organic photochromic substances disclosed in that patent from column 11, line 57 through column 13, line 36. Other photochromic substances contemplated for use herein are photochromic metal-dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38, and mixtures of the aforementioned suitable photochromic substances.

In addition, it is contemplated that a form of organic photochromic substance resistant to the effects of a polymerization initiator may also be added to the polymerizable coating composition of the present invention. Such organic photochromic substances include photochromic pigments and photochromic compounds encapsulated in metal oxides, the latter of which are described in U.S. Pat. Nos. 4,166,043 and 4,367,170.

The disclosures relating to such photochromic compounds in the aforedescribed patents are incorporated herein, in toto, by reference. The photochromic coatings of the present invention may contain a photochromic amount of one photochromic compound or a mixture of photochromic compounds, as desired. Mixtures of photochromic compounds may be used to attain certain activated colors such as a near neutral gray or brown. See, for example, U.S. Pat. No. 5,645,767, column 12, line 66 to column 13, line 19.

As used herein and in the claims, by "photochromic amount" is meant that amount of organic photochromic substance which is at least sufficient to produce a photochromic effect discernible to the naked eye upon activation. The particular amount used depends often upon the intensity of color desired upon irradiation thereof. Typically, the more photochromic substance present in the polymerizable composition of the present invention or that which is incorporated into a polymerizate of the present invention, the greater the color intensity of the resulting photochromic article.

The amount of photochromic substance used in the coating or polymerizate of the present invention may be from 0.1 to 40.0 weight percent, based on the total weight of monomers. The relative amounts of the aforesaid photochromic compounds used will vary and depend in part upon the relative intensities of the color of the activated species of such compounds, and the ultimate color desired. Preferably, the concentration of photochromic substances ranges from 1.0 to 30 weight percent, more preferably, from 3 to 20 weight percent, and most preferably, from 5 to 15 weight percent, e.g., from 7 to 14 weight percent. The amount of photochromic substance in the coating or polymerizate may range between any combination of these values, inclusive of the recited range, e.g. from 0.15 to 39.9 weight percent.

The photochromic compound(s) described herein may be incorporated into the coating composition by addition to the coating composition and/or by dissolving it in solvent before adding it to the coating composition. Alternatively, although less preferred the photochromic compound(s) may be incorporated into the cured coating or polymerizate by imbibition, permeation or other transfer methods, which methods are known to those skilled in the art.

Compatible (chemically and color-wise) tints, i.e., dyes, may be added to the coating composition, applied to the coated article or applied to the substrate prior to coating to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the substrate and/or coated article when the photochromic substance is in an unactivated state.

Adjuvant materials may also be incorporated into the coating composition with the photochromic substances, prior to, simultaneously with or subsequent to application or incorporation of the photochromic substances in the coating composition or cured coating. For example, ultraviolet light absorbers may be admixed with photochromic substances before their addition to the coating composition or such absorbers may be superposed, e.g., superimposed, as a layer between the photochromic coating and the incident light. Further, stabilizers may be admixed with the photochromic substances prior to their addition to the coating composition to improve the light fatigue resistance of the photochromic substances. Stabilizers, such as hindered amine light stabilizers (HALS), antioxidants, e.g., polyphenolic antioxidants, asymmetric diaryloxalamide (oxanilide) compounds and singlet oxygen quenchers, e.g., a nickel ion complex with an organic ligand, or mixtures of stabilizers are contemplated. They may be used alone or in combination. Such stabilizers are described in U.S. Pat. Nos. 4,720,356, 5,391,327 and 5,770,115, which patents are incorporated herein by reference.

The coating compositions of the present invention may be applied to substrates, of any type such as, for example paper, glass, ceramics, wood, masonry, textiles, metals and polymeric organic materials. Preferably, the substrate is a polymeric organic material, particularly, thermoset and thermoplastic polymeric organic materials, e.g., thermoplastic polycarbonate type polymers and thermoset polycarbonates such as homopolymers or copolymers of diethylene glycol bis(allyl carbonate), which are used as organic optical materials.

The amount of the coating composition applied to at least one surface of the substrate is an amount necessary to provide a sufficient quantity of the organic photochromic substance(s) to produce a coating that exhibits the required change in optical density ($\Delta OD$) when the cured coating is exposed to UV radiation. The required change in optical density is that which, when tested at 22° C. (72° F.), produces a $\Delta OD$ of at least 0.15 after 30 seconds and at least 0.50 after 15 minutes. The bleach rate of the photochromic coating (the photochromic(s) in the coating) should be 200 seconds or less using the photochromic response testing method described in more detail in Part G of Example 19 herein. The applied coating may have a thickness of at least 1 micron, e.g. 5 microns, preferably, at least 10 microns, more preferably, at least 20 microns, e.g., 25 microns. The applied coating will also usually have a thickness of not more than 200 microns, preferably not more than 100 microns, and more preferably not more than 50 microns, e.g., 40 microns. The thickness of the coating may range between any combination of these values, inclusive of the recited values, e.g., from 1 to 200 microns.

Prior to applying the coating composition, it is typical to treat the surface of the substrate for the purposes of cleaning it and for promoting adhesion. Effective treatment techniques for plastics, such as those prepared from CR-39® diethylene glycol bis(allyl carbonate) monomer or thermoplastic polycarbonate, e.g., a resin derived from bisphenol A and phosgene, include ultrasonic cleaning; washing with an aqueous mixture of organic solvent, e.g., a 50:50 mixture of isopropanol: water or ethanol: water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

The treatment used for cleaning glass surfaces, e.g., ophthalmic lenses, will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

In some cases, it may be necessary to apply a primer to the surface of the substrate before application of the coating composition of the present invention. The primer serves as a barrier coating to prevent interaction of the coating ingredients with the substrate and vice versa, and/or as an adhesive layer to adhere the coating composition to the substrate. Application of the primer may be by any of the methods used in coating technology such as, for example, spray coating, spin coating, spread coating, curtain coating, dip coating, casting or roll-coating.

The use of protective coatings, some of which may contain polymer-forming organosilanes, as primers to improve adhesion of subsequently applied coatings has been described. The use of non-tintable coatings as a primer is preferred. Examples of commercial coating products that may be used include, but are not limited to, SILVUE® 124 and HI-GARD® coatings, available from SDC Coatings, Inc. and PPG Industries, Inc., respectively. In addition, depending on the intended use of the coated article, it may be necessary to apply an appropriate protective coating(s), i.e., an abrasion resistant coating onto the exposed surface of the coating composition to prevent scratches from the effects of friction and abrasion. In some cases, the primer and protective coatings are interchangeable, i.e., the same coating may be used as the primer and the protective coating(s). Other coatings or surface treatments, e.g., a tintable coating, antireflective surface, etc., may also be applied to the cured coating of the present invention.

The coating composition of the present invention may be applied using the same methods described herein for applying the primer and the protective coating(s) or other methods known in the art can be used. The coating composition may be applied by spin coating, curtain coating, dip coating, spray coating or by methods used in preparing overlays. Such methods are described in U.S. Pat. No. 4,873,029, which disclosure is incorporated herein by reference.

Following application of the coating composition to the treated surface of the substrate, the coating is cured. Depending on the substrate and monomer components selected for the coating composition of the present invention, the coating may be cured by thermal polymerization, e.g. at temperatures ranging from 22° C. to 200° C., by photopolymerization or by a combination of the two methods. If heating is required to obtain a cured coating, temperatures of between 80° C. and a temperature above which the substrate is damaged due to heating, e.g., from 80° C. to 200° C., are typically used. For example, certain organic polymeric materials may be heated up to 130° C. for a period of 1 to 16 hours in order to cure the coating without causing damage to the substrate. While a range of temperatures has been described for thermally curing the coated substrate, it will be recognized by persons skilled in the art that temperatures other than those disclosed herein may be used. Curing of the photochromic poly(meth)acrylic coating composition may be accomplished by irradiating the coating with ultraviolet and/or visible light so as to initiate the polymerization reaction of the polymerizable components in the coating followed by a heating step.

Polymerization of the polymerizable components in the coating may be done by including in the composition an initiating amount of material capable of generating free radicals, such as organic peroxy compounds or azobis (organonitrile) compounds, i.e., an initiator. Preferably, the initiator is used in the least amount necessary to start the curing process. Generally, the curing process is more efficient in the absence of oxygen, for example, in the presence of nitrogen, as a greater amount of initiator is required in the presence of oxygen. Methods for polymerizing compositions comprised of monomers, having ethylenically unsaturated groups which are radically polymerizable, are well known to the skilled artisan and any of those well known techniques may be used to polymerize the aforedescribed polymerizable organic compositions. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not discolor the resulting coating or polymerizate.

Examples of suitable azobis(organonitrile) compounds, that may be used as thermal polymerization initiators include: azobis(isobutyronitrile), 2,2'-azobis(2,4-dimethylpentanenitrile), 1,1'-azobiscyclohexanecarbonitrile and azobis(2,4-dimethylvaleronitrile) or mixtures of such initiators. Preferably, the thermal initiator is 2,2'-azobis(2, 4-dimethylpentanenitrile, 1,1'-azobiscyclohexanecarbonitrile or mixtures thereof.

The amount of thermal polymerization initiator used to initiate and polymerize the polymerizable components in the coating composition of the present invention may vary and will depend on the particular initiator used. Only that amount that is required to initiate and sustain the polymerization reaction is required, i.e., an initiating amount. With respect to the preferred azobis(organonitrile) compounds, between 0.01 and 5.0 parts of that initiator per 100 parts of the polymerizable organic composition (phm) may be used. More usually, between 0.05 and 3.0 phm is used to initiate the polymerization. Typically, the thermal cure cycle involves heating the polymerizable organic composition in the presence of the initiator from room temperature to 85° C. to 125° C. over a period of from 2 to 20 minutes for a coating and from 2 hours to 30 hours for a polymerizate.

Photopolymerization of the polymerizable components in the coating may be carried out in the presence of a photoinitiator using ultraviolet light and/or visible light. Photoinitiators, which are free radical initiators, are classified in two major groups based upon a mode of action. Cleavage-type photoinitiators include acetophenones, α-aminoalkylphenones, benzoin ethers, benzoyl oximes, acylphosphine oxides and bisacylphosphine oxides and mixtures of such initiators. Abstraction-type photoinitiators include benzophenone, Michler's ketone, thioxanthone, anthraquinone, camphorquinone, fluorone, ketocoumarin and mixtures of such initiators. Abstraction-type photoinitiators function better in the presence of materials such as amines and other hydrogen donor materials added to provide labile hydrogen atoms for abstraction. Typical hydrogen donors have an active hydrogen positioned alpha to an oxygen or nitrogen, e.g., alcohols, ethers and tertiary amines, or an active hydrogen atom directly attached to sulfur, e.g., thiols. In the absence of such added materials, photoinitiation may still occur via hydrogen abstraction from monomers, oligomers or other components of the system.

Cationic photoinitiators may also be used in conjunction with the aforementioned photoinitiators. Preferably, cationic initiators are used with abstraction type photoinitiators, hydrogen donor materials such as butyryl choline triphenylbutyl borate, or combinations of such materials. The preferred cationic photoinitiators are onium salts described in U.S. Pat. No. 5,639,802, column 8, line 59 to column 10, line 46, which disclosure is incorporated herein by reference. Examples of such initiators include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate and mixtures thereof.

Examples of photopolymerization initiators which may be used include benzil, benzoin, benzoin methyl ether, benzoin isobutyl ether benzophenol, acetophenone, benzophenone, 4,4'-dichlorobenzophenone, 4,4'-bis(N,N'-dimethylamino) benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, 2,6-dichlorobenzoyldiphenylphosphine oxide, and 2,6-dimethoxybenzoyldiphenylphosphine oxide, bisacylphosphine oxides, e.g., bis(2,6-dimethyoxybenzoyl)-2,4,4-trimethylepentylphosphine oxide, bis(2,6-dimethylbenzoyl)-2,4,4-trimethylpentylphosphine oxide, bis (2,4,6-trimethylbenzoyl)-2,4,4-trimethylpentylphosphine oxide, and bis(2,6-dichlorobenzoyl)-2,4,4-trimethylpentylphosphine oxide, phenyl-4-octyloxyphenyliodonium hexafluoroantimonate, dodecyldiphenyliodonium hexafluoroantimonate, (4-(2-tetradecanol)oxyphenyl)iodonium hexafluoroantimonate and mixtures thereof.

Examples of hydrogen or electron donor materials which may be utilized in combination with photoinitiators include, but are not limited to, one or more of the following: N,N-dimethyl-2,6-diisopropylanile, N-phenylglycine, ethyl-4-dimethylaminobenzoate, octyl-p-(dimethylamino) benzoate, N-methyldiethanolamine, triethanolamine, diethylethanolamine, triethylamine, diisopropylethylamine, dimethylaminomethylphenol, benzyldimethylamine, tetramethyl ammonium triphenylbutyl borate and butyryl choline triphenylbutyl borate.

The amount of photopolymerization initiator used to initiate and polymerize the polymerizable components of the coating vary and will depend on the particular initiator used. Only that amount that is required to initiate and sustain the polymerization reaction is required, i.e., an initiating amount. The photopolymerization initiator may be used in an amount from 0.01% to 5% by weight, based on the weight of monomer components.

The light source used for the photopolymerization is preferably selected from those which emit ultraviolet light and/or visible light. The light source may be a mercury lamp, a mercury lamp doped with $FeI_3$ and/or $GaI_3$, a germicidal lamp, a xenon lamp, a tungsten lamp, a metal halide lamp or a combination of such lamps. Typically, the absorbance spectra of the photoinitiator or photoinitiator combination is matched with the spectral output of the bulb, for example, H bulb, D bulb, Q bulb and/or V bulb for highest curing efficiency. The exposure time may vary depending upon the wavelength and intensity of the light source, the photoinitiator, and thickness of the coating. The coating of the present invention may also be cured using an electron beam process which doesn't require the presence of an initiator.

The amount of thermal polymerization initiator and/or photopolymerization initiator and the consequent cure cycle should be adequate to produce a coating or polymerizate according to the present invention having a Fischer microhardness of from 50 to 150 Newtons per $mm^2$ and the desired photochromic properties of a $\Delta OD$ after 30 seconds of at least 0.15, after 15 minutes of at least 0.50 and a bleach rate of not more than 200 seconds—all as measured in the 22° C. (72° F.) Photochromic Performance Test described herein.

Desirably, the resulting cured coating meets commercially acceptable "cosmetic" standards for optical coatings. Examples of cosmetic defects of coated lens include pits, spots, inclusions, cracks and crazing of the coating. Most preferably, the coatings prepared using the photochromic coating composition of the present invention are substantially free of cosmetic defects.

Examples of polymeric organic materials that may be substrates for the coating composition of the present invention are polymers, i.e., homopolymers and copolymers, of the monomers and mixtures of monomers disclosed in U. S. Pat. No. 5,658,501 from column 15, line 28 to column 16, line 17, which is incorporated herein by reference.

Examples of such monomers and polymers include: polyol(allyl carbonate)monomers, e.g., diethylene glycol bis(allyl carbonate), which monomer is sold under the trademark CR-39; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bis methacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyurethanes, polythiourethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS and mixtures thereof.

One particularly contemplated embodiment, is the use of the combination of the photochromic poly(meth)acrylic coating composition of the present invention with polymeric organic materials such as optically clear polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc. Such optically clear polymerizates may have a refractive index that may range from about 1.48 to about 2.00, e.g., from about 1.495 to about 1.75. Specifically contemplated are optical elements made of thermoplastic polycarbonates and thermoset polycarbonates. Application of the photochromic poly(meth)acrylic coating composition of the present invention to a polymeric film in the form of an "applique" may be accomplished using the methods describe in column 17, line 28 to column 18, line 57 of U.S. Pat. No. 5,198,267.

Another particularly contemplated embodiment, is the use of the combination of the photochromic poly(meth)acrylic coating composition of the present invention with optical elements to produce photochromic optical articles. Such articles may be prepared by sequentially applying, e.g., by spraying, to the optical element a primer, the photochromic poly(meth)acrylic composition of the present invention and appropriate protective coating(s). The resulting cured coating preferably meets commercially acceptable "cosmetic" standards for optical coatings, and most preferably, is substantially free of cosmetic defects.

The present invention is more particularly described in the following examples, which are intended as illustrative only, since numerous modifications and variations therein will be apparent to those skilled in the art.

COMPOSITION A

The following materials were added in the order described to a suitable vessel equipped with an agitator and mixed for 1 hour.

| Materials | Weight (Grams) |
| --- | --- |
| BPA 4E0 DMA[1] | 500.0 |
| PEG 600 DMA[2] | 166.7 |

[1]Bisphenol A ethoxylated (2EO/phenol) dimethacrylate.
[2]Polyethyleneglycol (600) dimethacrylate.

COMPOSITION B

The following materials were added in the order described to a suitable vessel equipped with an agitator and mixed for 1 hour.

| Materials | Weight (Grams) |
|---|---|
| NMP[3] | 50.0 |
| Photochromic No. 1[4] | 40.0 |

[3] N-methylpyrrolidone solvent of 99 percent purity.
[4] A photochromic naphtho[1,2-b]pyran that exhibits a blue color when irradiated with ultraviolet light.

COMPOSITION C

The following materials were added in the order described to a suitable vessel equipped with an agitator and mixed for 1 hour.

| Materials | Weight (Grams) |
|---|---|
| COMPOSITION B | 14.4 |
| H-Nu 470[5] | 0.080 |
| SarCat ® CD-1012[6] | 0.193 |
| DIDMA[7] | 0.320 |

[5] A fluorone visible light initiator having a λ max at 470 nm, reported to be 2,4-diiodo-6-butoxy-3-fluorone, available from Spectra Group Limited.
[6] A cationic photoinitiator, reported to be [4-[(2-tetradecanol)oxy]phenyl] phenyl iodonium hexafluoroantimonate, available from Sartomer Company, Inc.
[7] An amine hydrogen donor, reported to be N,N-dimethyl-2,6-diisopropylaniline, available from Carbolabs Inc.

COMPOSITION D

The following materials were added in the order described to a suitable vessel equipped with an agitator and mixed for 1 hour.

| Materials | Weight (Grams) |
|---|---|
| COMPOSITION B | 14.4 |
| SarCat ® CD-1012 | 0.56 |
| Borate 5[8] | 0.56 |

[8] A hydrogen donor, reported to be butyryl choline triphenylbutyl borate, available from Spectra Group Limited.

COMPOSITION E

The following materials were added in the order described to a suitable vessel equipped with an agitator and mixed for 1 hour.

| Materials | Weight (Grams) |
|---|---|
| COMPOSITION B | 28.8 |
| H-Nu 470 | 0.048 |
| SarCat ® CD-1012 | 0.400 |
| Borate 5 | 0.400 |

COMPOSITION F

The following materials were added in the order described to a suitable vessel equipped with an agitator and mixed for 1 hour.

| Materials | Weight (Grams) |
|---|---|
| COMPOSITION B | 14.4 |
| H-Nu 470 | 0.080 |
| Borate 5 | 0.400 |

COMPOSITION G

The following materials were added in the order described to a suitable vessel equipped with an agitator and mixed for 1 hour.

| Materials | Weight (Grams) |
|---|---|
| COMPOSITION B | 36.00 |
| SarCat ® CD-1012 | 0.48 |
| H-Nu 470 | 0.20 |
| DIDMA | 0.80 |

EXAMPLE 1

The following materials were added in the order described to a suitable vessel equipped with an agitator and mixed for 1 hour.

| Materials | Weight (Grams) |
|---|---|
| COMPOSITION E | 3.61 |
| COMPOSITION A | 20.0 |

EXAMPLE 2

The following materials were added in the order described to a suitable vessel equipped with an agitator and mixed for 1 hour.

| Materials | Weight (Grams) |
|---|---|
| COMPOSITION F | 3.61 |
| COMPOSITION A | 20.0 |

EXAMPLE 3

The following materials were added in the order described to a suitable vessel equipped with an agitator and mixed for 1 hour.

| Materials | Weight (Grams) |
|---|---|
| COMPOSITION C | 3.61 |
| COMPOSITION A | 20.0 |

EXAMPLE 4

The following materials were added in the order described to a suitable vessel equipped with an agitator and mixed for 1 hour.

| Materials | Weight (Grams) |
|---|---|
| COMPOSITION D | 3.60 |
| COMPOSITION A | 20.0 |

EXAMPLE 5

The following materials were added in the order described to a suitable vessel equipped with an agitator and mixed for 17 hours.

| Materials | Weight (Grams) |
|---|---|
| COMPOSITION B | 3.6 |
| BPA 4EO DMA | 16.0 |
| PEG 600 DMA | 4.0 |
| DIDMA | 0.083 |
| OPPI[9] | 0.051 |
| H-Nu 470 | 0.020 |

[9]A cationic photoinitiator, reported to be phenyl-4-octyloxyphenyliodonium hexafluoroantimonate, available from GE Silicones.

EXAMPLE 6

The following materials were added in the order described to a suitable vessel equipped with an agitator and mixed for 1 hour.

| Materials | Weight (Grams) |
|---|---|
| COMPOSITION C | 3.75 |
| BPA 4EO DMA | 14.0 |
| PEG 600 DMA | 6.0 |

EXAMPLE 7

The following materials were added in the order described to a suitable vessel equipped with an agitator and mixed for 1 hour.

| Materials | Weight (Grams) |
|---|---|
| COMPOSITION E | 3.71 |
| COMPOSITION A | 20.0 |

EXAMPLE 8

The procedure of Example 6 was followed except that 13.0 grams of BPA 4 EO DMA and 7.0 grams of PEG 600 DMA were used.

EXAMPLE 9

The following materials were added in the order described to a suitable vessel equipped with an agitator.

| Material | Weight (Grams) |
|---|---|
| Charge 1 | |
| NMP | 2.0 |
| Photochromic 1 | 1.0 |
| Charge 2 | |
| BPA 4EO DMA | 6.3 |
| PEG 600 EMA | 3.7 |
| BAPO[10] | 0.05 |
| FC-431[11] | 0.01 |

[10]Bis (2,6-dimethoxybenzoyl)phenylphosphine oxide.
[11]A fluorinated surfactant available from 3M.

After Charge 1 was added to the vessel, the agitator was turned on and mixed for 60 minutes. Charge 2 was added and the resulting solution was mixed for another 60 minutes. The resulting solution was kept quiescent for about 24 hours or until it was substantially free of bubbles.

EXAMPLE 10

The procedure of Example 9 was followed except that the following materials were used.

| Material | Weight (Grams) |
|---|---|
| COMPOSITION B | 3.6 |
| BPA 4EO DMA | 13.4 |
| PEG 600 PMA | 6.6 |
| TPO[12] | 0.10 |
| FC-431 | 0.02 |

[12]2,4,6-Trimethylbenzoyldiphenylphosphine oxide.

EXAMPLE 11

The procedure of Example 10 was followed except that BAPO was used in place of TPO.

Comparative Example 1

The procedure of Example 5 was followed except that 12 grams of BPA 4EO DMA and 8 grams of PEG 600 DMA were used.

Comparative Example 2

The procedure of Example 9 was followed except that the following materials were used.

| Material | Weight (Grams) |
|---|---|
| NMP | 2.0 |
| Photochromic 1 | 1.0 |
| BPA 2EO DMA[13] | 5.0 |
| BPA 10EO DMA[14] | 4.0 |
| GMA[15] | 1.0 |
| BAPO | 0.05 |
| FC-431 | 0.01 |

[13]Bisphenol A ethoxylated (1EO/phenyl) dimethacrylate.
[14]Bisphenol A ethoxylated (5EO/phenyl) dimethacrylate.
[15]Glycidyl methacrylate.

Comparative Example 3

The procedure of Comparative Example 2 was followed except that the following materials were used.

| Material | Weight (Grams) |
|---|---|
| NMP | 2.0 |
| Photochromic 1 | 1.0 |
| BPA 2EO DMA | 4.0 |
| TEG DMA[16] | 5.5 |
| HEMA[17] | 0.5 |
| BAPO | 0.05 |
| FC-431 | 0.01 |

[16] Tetraethylene glycol dimethacrylate.
[17] 2-Hydroxyethyl methacrylate.

Comparative Example 4

The procedure of Comparative Example 3 was followed except that the following materials were used.

| Material | Weight (Grams) |
|---|---|
| NMP | 2.0 |
| Photochromic 1 | 1.0 |
| TriEG DMA[18] | 6.0 |
| HMDMA[19] | 1.5 |
| BAPO | 0.05 |
| FC-431 | 0.01 |

[18] Triethylene glycol dimethacrylate.
[19] Hexamethylene dimethacrylate.

EXAMPLE 12

Part A

The following materials were added in the order described to a suitable vessel equipped with an agitator and mixed for 1 hour.

| Material | Weight (Grams) |
|---|---|
| NMP | 20.0 |
| Photochromic 1 | 10.0 |
| VAZO-52[20] | 1.25 |
| FC-431 | 0.05 |

[20] Vinyl polymerization catalyst, reported to be 2,2'-azobis (2,4-dimethylpentanenitrile), available from DuPont.

Part B

The procedure of Part A was followed using the following materials. The resulting solution was kept quiescent for about 24 hours or until it was substantially free of bubbles.

| Materials | Weight (Grams) |
|---|---|
| Product of Part A | 1.55 |
| BPA 4EO DMA | 2.00 |
| PEG 400 DMA[21] | 3.00 |

[21] Polyethylene glycol (400) dimethacrylate having a number average molecular weight of approximately 508.

Comparative Example 5

The procedure of Example 12 was followed except that 5 grams of BPA 10EO DMA was used in place of BPA 4EO DMA and PEG 400 DMA.

EXAMPLE 13

The procedure of Example 12 was followed except that 4 grams of BPA 6EO DMA and 1 gram of PEG 600 DMA were used.

EXAMPLE 14

The following materials were added in the order listed to a suitable container and mixed for 1 hour. The resulting solution was left quiescent for about 24 hours or until it was substantially free of bubbles.

| Materials | Weight (Grams) |
|---|---|
| NMP | 5.00 |
| Photochromic 1 | 4.00 |
| VAZO-52 | 0.63 |
| FC 431 | 0.08 |
| PEG(600)DMA | 18.50 |
| BPA(4EO)DMA | 31.52 |

EXAMPLE 15

The procedure of Example 14 was followed except that VAZO-52 was replaced with an equal amount of VAZO-88 (a vinyl polymerization catalyst available from Du Pont).

EXAMPLE 16

The procedure of Example 14 was followed except that 25 grams of BPA(4EO)DMA and 25 grams of PEG(600) were used.

Comparative Example 6

The procedure of Example 14 was followed except that 35 grams of BPA 4EO DMA and 15 grams of PEG 600 DMA were used.

EXAMPLE 17

The following materials were added in the order described to a suitable vessel equipped with an agitation and means for heating.

| Material | Weight (Grams) |
|---|---|
| Change 1 | |
| NMP | 3.0 |
| Photochromic 1 | 0.81 |
| Photochromic 2[22] | 0.69 |
| Change 2 | |
| BPA 4EO DMA | 9.49 |
| PEG 600 DMA | 5.57 |
| TINUVIN 144 UV Stabilizer[23] | 0.31 |
| TPO | 0.07 |
| FC-431 | 0.02 |

[22] A naphtho[1,2-b]pyran that exhibits a red-orange color when irradiated with ultraviolet light.
[23] A hindered amine ultraviolet light stabilizer available from CIBA-GEIGY Corp.

After Charge 1 was added to the vessel, the agitator was turned on and the solution was heated to 60° C. to dissolve the components. Charge 2 was added and the resulting solution was maintained at 60° C. and mixed for about 1½ hours.

EXAMPLE 18

The following materials were added in the order described to a suitable vessel equipped with an agitator and mixed for 1 hour.

| Material | Weight (Grams) |
|---|---|
| COMPOSITION G | 3.75 |
| BPA 4EO DMA | 17.00 |
| PEG 600 DMA | 3.00 |

Comparative Example 7

The procedure of Example 18 was followed except that 18.0 grams of BPA 4EO DMA and 2.0 grams of PEG 600 DMA were used.

EXAMPLE 19

PART A

Step 1

An isophorone diisocyanate-hydroxyethyl methacrylate (IPDI-HEMA) adduct having a total solids content of approximately 83 weight percent was used. A procedure for preparing such a material is described by Antonucci, J. M., et al, "Isocyanato Urethane Methacrylates Derived from Hydroxyethyl Methacrylates", Journal of Dental Research, January 1980, pp. 35–43, which is incorporated herein by reference.

Step 2

The (IPDI-HEMA) adduct, 44 grams, of Step 1 was added to a reaction flask containing methyl ethyl ketone, 400 grams. The resulting mixture was stirred until a clear solution was obtained.

Part B

Lens blanks prepared from CR-39® monomer were immersed in a 40 weight percent, based on the total weight of the solution, of an aqueous potassium hydroxide solution for 20 minutes and rinsed with deionized water. Lens blanks which were coated with the solutions of Examples 5, 6, 10 to 16 and 18 and Comparative Examples (CE) 1, 5, 6 and 7 were used without further processing. Lenses to be coated with the solutions of Examples 1 through 4, 7 and 8 were spin coated with the solution of Part A at 1500 rpm for 10 sec. The coated lenses were heated at 100° C. for 10 minutes; cooled to room temperature; rinsed with acetone or gently wiped with a tissue, such as KIMWIPES® EX-L, soaked with acetone; washed with dishwashing detergent and water; rinsed with isopropyl alcohol or gently wiped with an isopropyl alcohol soaked tissue prior to further processing as described in Parts C and D.

Lens blanks which were coated with the solutions of Examples 9 and 17 and Comparative Examples 2, 3 and 4 were pretreated prior to coating. Lens blanks coated with the solution of Example 17 were treated with a proprietary adhesion promoter solution and process, while the others were coated with an adhesion promoting solution that was prepared by adding N,N-dimethyldodecyl amine (0.3 g) to a reaction flask containing methacrylic anhydride (10.0 g) and then stirring the contents of the flask until the resultant solution was clear. The adhesion promoting solution was applied using the aforedescribed procedure for applying the adhesion promoting solution of Part A.

Part C

The lenses prepared in Part B were spin coated at the speeds and for the time period listed in Table 1. The variety of conditions listed in Table 1 were used to obtain a coating thickness of about 20 microns and/or comparable UV absorbances at 390 nanometers due to changes in solution viscosity.

TABLE 1

| | Revolutions per minute | Time (seconds) |
|---|---|---|
| Example 5 | 2200 | 8 |
| Examples 3, 4 & 7 | 2000 | 8 |
| CE 7 | 2000 | 10 |
| Example 18 | 2000 | 9 |
| Examples 1 & 2 | 2000 | 7 |
| Example 8 | 2000 | 6 |
| Example 6 | 1900 | 8 |
| CE 1 | 1600 | 8 |
| Example 9 | 1500 | 3 |
| Example 12 | 1500 | 3.5 |
| Example 17 | 1500 | 4 |
| Examples 14, 15, 16 & CE 6 | 1500 | 7 |
| Examples 10 & 11 | 1500 | 10 |
| CE 5 | 1500 | 9 |
| CE 2 | 1500 | 5 |
| Example 13 | 1300 | 9 |
| CE 3 | 700 | 4 |
| CE 4 | 500 | 3 |

Part D

The lenses coated with Examples 1–3 were placed in a vacuum chamber having a quartz window in which a residual pressure of at least 40 mm was attained within 2 minutes of pumping. The vacuum chamber was filled with nitrogen and the coated lenses were irradiated for 6 minutes at a distance of 2.5 in (6.35 cm) from a 500 watt Quartzline® Tungsten-Halogen lamp. The lens coated with the solution of Example 8 was processed in a similar fashion except that the lens was irradiated for 5 minutes. The lenses coated with Examples 5, 6 and 18 and CE 1 and 7 were irradiated for 5 minutes at a distance of 1.5 in (3.81 cm) from a 500 watt Quartzline® Tungsten-Halogen lamp. The lenses coated with Example 7 were irradiated for 4 minutes at a distance of 1.5 in (3.81 cm) from a 500 watt Quartzline® Tungsten-Halogen.

In the chamber, the lenses coated with Examples 1–3 reached a maximum temperature of 155° C. as measured by a thermocouple attached to the surface of an uncoated lens blank. The lenses coated with the solutions of Examples 7 and 8 reached maximum temperatures of 174° C. and 145° C., respectively. The lenses coated with the solutions of Example 18 and CE 7 reached a maximum temperature of 145° C. The lenses coated with the solutions of Examples 5 and 6 and CE 1 were monitored for temperature exposure in a similar manner and reached a maximum temperature of 200° C.

The lens coated with the solution of Example 4 was processed in the same vacuum chamber as the others except that the chamber was backflushed with argon and the coated lens was exposed for 9 minutes at a distance of 4 inches from a xenon lamp solar simulator. The lamp used was model # 81172 from the Oriel Corporation. The lens reached a temperature of 100° C. during the curing process.

The lenses coated with the solutions of Examples 12 to 16, CE 5 and CE 6 in Part C were placed in the afore-described vacuum chamber. The chamber was flushed with nitrogen for about 3 minutes. The lenses were cured by exposure to infrared radiation for 4 minutes in the chamber. The lenses reached a maximum temperature of about 124° C. The lenses coated in Part C with the solutions of Examples 9 to 11, Example 17 and CE 2 to CE 4 were cured by exposure to ultraviolet light by one of two procedures. The lenses coated with the solutions of Examples 9 and 17 and CE 2, 3 and 4 were placed in the vacuum chamber. The chamber was flushed with nitrogen for about 30 seconds and the lens exposed to UV light by passing them 5 times, while supported on a conveyor belt, at a speed of 3 feet per minute 4 inches beneath an ultraviolet "type D" lamp of 6 inch length from Fusion UV Systems, Inc. The lamp had an output rating of 300 watts per inch. Multiple lenses coated with the solutions of Examples 10 and 11 were cured in an Aetek Q.C. unit under the conditions of varying conveyor speed, lamp type, e.g., mercury lamps (Hg), mercury lamps with dopants iron iodide ($FeI_3$) or gallium iodide ($GaI_3$), power setting and number of passes through the unit as indicated in Table 2.

TABLE 2

| Example No. | Conveyor speed ft./min. | Lamp type(s) (watts/inch) | Number of Passes |
|---|---|---|---|
| 10a | 7 | $FeI_3$ (200) | 4 |
| 10b | 6 | $GaI_3$ (200) | 4 |
| 11a | 7 | $FeI_3$ (200) | 4 |
| 11b | 6 | $GaI_3$ (200) | 4 |
| 11c | 5.5 | $GaI_3$ (200) & Hg (200) | 2 |

Part E

The photochromic coated lenses prepared in Part D were subjected to microhardness testing using a Fischerscope HCV, Model H-100 available from Fischer Technology, Inc. The microhardness, measured in Newtons per $mm^2$, of the coated lenses of the Examples and Comparative Examples was determined under the conditions of a 100 milliNewton load, 30 load steps and 0.5 second pauses between load steps. The results reported in Table 3 were measured at an indentor depth of 2 μm.

TABLE 3

| Example No. | Microhardness Newtons per $mm^2$ |
|---|---|
| 1 | 17 |
| 2 | 113 |
| 3 | 123 |
| 4 | 120 |
| 5 | 127 |
| 6 | 75 |
| 8 | 56 |
| 9 | 99 |
| 10 | 100 |
| 10 | 102 |
| 11 | 105 |
| 11 | 105 |
| 11 | 100 |
| 12 | 105 |
| 13 | 120 |
| 14 | 107 |
| 15 | 94 |
| 16 | 58 |

TABLE 3-continued

| Example No. | Microhardness Newtons per $mm^2$ |
|---|---|
| 17 | 85 |
| 18 | 128 |
| CE 1 | 30 |
| CE 2 | 169 |
| CE 3 | 173 |
| CE 4 | 173 |
| CE 5 | 41 |
| CE 6 | 126 |
| CE 7 | 133 |

The results of Table 3 show that only the photochromic coated lenses prepared using the solutions of Examples 1–6, 8–17 Comparative Examples 6 and 7 demonstrated microhardness results within the desired range of 50 to 150 Newtons per $mm^2$.

Part F

The adhesion of the coating to duplicate lenses coated with Example 7 prepared in Parts C and D was tested by using the method found in ASTM D-3359-93 Standard Test Method for Measuring Adhesion by Tape Test—Method B. The tape used was 3M #600 clear tape. Testing was performed prior to immersing the lenses in boiling deionized water and after 60 minutes of immersion in the boiling water. The adhesion test results revealed no loss of the coating of Example 7 before or after immersion in the boiling water.

Two lenses coated with the solution of Example 17 were processed further by different methods. The first lens, identified as lens 17A, was etched by immersion in a 40 weight percent aqueous potassium hydroxide solution for 5 minutes and rinsed with deionized water. The second lens identified as lens 17B, was not etched. Both lenses were coated with HI-GARD® 1040 abrasion resistant transparent coating (available from PPG Industries, Inc.) by spin coating at 2000 rpm for 13 seconds. Afterwards, the coated lenses were cured for 20 minutes at 60° C. and for 3 hours at 120° C.

The adhesion of the abrasion resistant coating applied to lenses 17A and 17B was tested by using the method found in ASTM D-3359-93 Standard Test Method for Measuring Adhesion by Tape Test—Method B. The tape used was 3M #600 clear tape. Testing was performed after immersing the lenses in boiling deionized water for 60 minutes. The adhesion test results revealed no loss of protective coating on lens 17A, while lens 17B experienced a 100 percent loss of the protective coating.

Part G

The photochromic coated lenses prepared in Part D, except those coated with the solutions of Examples 7 and 17, were screened for ultraviolet absorbance and lenses having comparable UV absorbance at 390 nanometers were tested for photochromic response on an optical bench. Prior to testing on the optical bench, the photochromic lenses were exposed to 365 nanometer ultraviolet light for about 30 minutes to activate the photochromic compounds and then placed in a 75° C. oven for about 20 minutes to bleach (inactivate) the photochromic compounds. The coated lenses were then cooled to room temperature, exposed to fluorescent room lighting for at least 2 hours and then kept covered for at least 2 hours prior to testing on an optical bench. The bench was fitted with a 300 watt Xenon arc lamp, a remote controlled shutter, a Schott 3 mm KG-2 band-pass filters which removes short wavelength radiation, neutral density filter(s), a temperature controlled water cell/sample holder having quartz windows in which the lens to be tested was inserted.

The power output of the optical bench, i.e., the dosage of light that the sample lens would be exposed to, was adjusted to 0.67 milliwatts per square centimeter (mW/cm$^2$) for samples tested at 22° C. (72° F.) and at 0.90 mW/cm$^2$ for samples tested at 27° C. (81° F.). Measurement of the power output was made using a GRASEBY Optronics Model S-371 portable photometer (Serial #21536) with a UV-A detector (Serial # 22411) or comparable equipment. The UV-A detector was placed into the sample holder and the light output was measured. Adjustments to the power output were made by increasing or decreasing the lamp wattage or by adding or removing neutral density filters in the light path.

A monitoring, collimated beam of light from a tungsten lamp was passed through the sample at 30° normal to the surface of the lens. After passing through the lens, the light from the tungsten lamp was directed through a 570 nm filter attached to a detector. The output signals from the detector were processed by a radiometer. The control of the test conditions and acquisition of data was handled by the Labtech Notebook Pro software and the recommended I/O board.

Change in optical density (ΔOD) from the bleached state to the darkened state was determined by establishing the initial transmittance, opening the shutter from the Xenon lamp to provide ultraviolet radiation to change the test lens from the bleached state to an activated (i.e., darkened) state at selected intervals of time, measuring the transmittance in the activated state, and calculating the change in optical density according to the formula: ΔOD=log(%Tb/%Ta), where %Tb is the percent transmittance in the bleached state, %Ta is the percent transmittance in the activated state and the logarithm is to the base 10.

The ΔOD was measured after the first thirty (30) seconds of UV exposure and then after fifteen (15) minutes in the 22° C. (72° F.) Photochromic Performance Test using the test parameters described hereinafter. The Bleach Rate (T ½) is the time interval in seconds for the ΔOD of the activated form of the photochromic compound in the coated lenses to reach one half the highest ΔOD at 20° C. (72° F.) after removal of the source of activating light. For the lenses tested at 27° C. (81° F.), the ΔOD was measured after the first thirty (30) seconds of UV exposure and then after eight (8) minutes in the 27° C. (81° F.) Photochromic Performance Test using the aforedescribed test parameters. Results for the photochromic coated lenses tested at 27° C. (81° F.) are listed in Table 4. Results for the photochromic coated lenses tested at 22° C. (72° F.) are listed in Table 5.

TABLE 4

| Example No. | 81° F. ΔOD @ 30 Seconds | 81° F. ΔOD @ 8 Minutes | 81° F. T 1/2 Seconds |
|---|---|---|---|
| 1 | 0.25 | 0.71 | 132 |
| 2 | 0.48 | 0.71 | 40 |
| 3 | 0.28 | 0.73 | 102 |
| 4 | 0.26 | 0.72 | 122 |
| 5 | 0.29 | 0.74 | 98 |
| 6 | 0.47 | 0.79 | 50 |
| 8 | 0.55 | 0.79 | 40 |
| 18 | 0.26 | 0.75 | 134 |
| CE 1 | 0.55 | 0.79 | 38 |
| CE 7 | 0.18 | 0.67 | 206 |

In Table 4, all of the photochromic coated lenses tested, except those of Comparative Example 7, exhibited the photochromic properties of a 27° C. ΔOD at 30 seconds of at least 0.20 and at 8 minutes of at least 0.50 and a Bleach Rate less than 150 seconds.

TABLE 5

| Example No. | 72° F. ΔOD @ 30 (seconds) | 72° F. ΔOD @ 15 (minutes) | 72° F. (T 1/2) (seconds) |
|---|---|---|---|
| 9 | 0.30 | 0.86 | 130 |
| 10a | 0.25 | 0.76 | 130 |
| 10b | 0.22 | 0.74 | 152 |
| 11a | 0.20 | 0.74 | 180 |
| 11b | 0.19 | 0.74 | 194 |
| 11c | 0.22 | 0.72 | 144 |
| 12 | 0.34 | 0.85 | 113 |
| 13 | 0.25 | 0.87 | 172 |
| 14 | 0.25 | 0.87 | 180 |
| 15 | 0.26 | 0.80 | 139 |
| 16 | 0.40 | 0.78 | 84 |
| CE 2 | 0.12 | 0.67 | 407 |
| CE 3 | 0.11 | 0.66 | 562 |
| CE 4 | 0.12 | 0.65 | 556 |
| CE 5 | 0.46 | 0.85 | 61 |
| CE 6 | 0.22 | 0.85 | 318 |

The results of Table 5 show that lenses coated with Comparative Example 5 in addition to those coated with Examples 9 through 16 demonstrated acceptable photochromic performance results for 22° C. (72° F.), i.e., a ΔOD of at least 0.15 after 30 seconds and at least 0.50 after 15 minutes with a Bleach rate (T ½) of less than 200 seconds.

Comparative Examples 2 through 4 were prepared using components disclosed in WO 96/37573 A1 that did not yield coated lenses demonstrating either the desired Fischer microhardness and/or photochromic performance. Comparative Example 5 demonstrated a Fischer microhardness below the desired level. Comparative Example 6 contained components in proportions that resulted in a Bleach rate higher than the desired limit of less than 200 seconds.

Although the present invention has been described with reference to specific details of certain embodiments thereof, it is not intended that such details should be regarded as limitations upon the scope of the invention except insofar as they are included in the accompanying claims.

We claim:

1. An article comprising, in combination, a substrate and a photochromic poly(meth)acrylic coating on at least one surface of said substrate, said coating comprising a polymerizate of:

(a) at least two difunctional (meth)acrylate monomers selected from:
(i) a first monomer, represented by the following general formula:

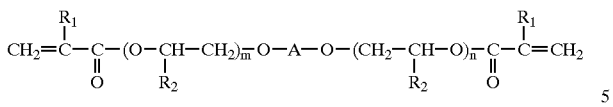

wherein each $R_1$ is hydrogen or methyl, each $R_2$ is hydrogen or $C_1$–$C_2$ alkyl, m and n are each a positive number, the sum of m and n being greater than 3 but less than 15, and A is a divalent linking group selected from the group consisting of straight or branched chain alkylene, phenylene, $C_1$–$C_9$ alkyl substituted phenylene, and a group represented by the following graphic formula:

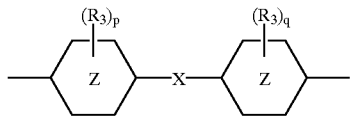

wherein, each $R_3$ is $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —CH═CH—, —C($CH_3$)$_2$—, —C($CH_3$)($C_6H_5$)— or

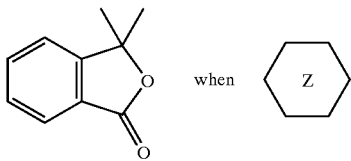

is the divalent benzene group, and X is O, S, —$CH_2$—, or —C($CH_3$)$_2$— when

is the divalent cyclohexane group; and
  (ii) a second monomer represented by the following general formula:

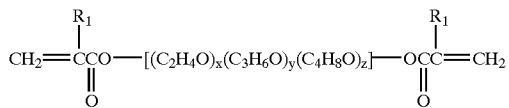

wherein each $R_1$ is hydrogen or methyl, x, y and z are each a number between 0 and less than 15 and the sum of x, y and z is greater than 3 and less than 15; said monomers being in a weight ratio of (i):(ii) of from greater than 10:90 to less than 90:10;
  (b) a photochromic amount, of a photochromic component; and
  (c) from 0 to 10 weight percent, based on the total weight of monomers, of polymerization initiator selected from thermal initiators, photoinitiators or mixtures of such initiators, said coating being free of chain transfer agents and said components (a), (b) and (c) being used in such proportions to produce a photochromic poly (meth)acrylic coating having a Fischer microhardness of between 50 and 150 Newtons per $mm^2$, a ΔOD at 30 seconds of at least 0.15 and at 15 minutes of at least 0.50, and a bleach rate of not more than 200 seconds—all as measured at 22° C. (72° F.).

2. The article of claim 1 wherein:
  (a) for said first monomer, each $R_1$ is methyl, each $R_2$ is hydrogen, the divalent linking group A is represented by the following graphic formula:

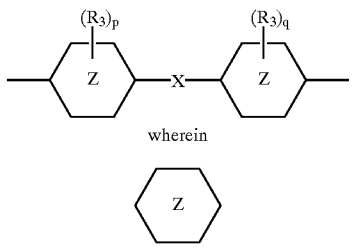

wherein is the divalent benzene group, p and q are each 0 and X is —C($CH_3$)$_2$—; and
  (b) for said second monomer, each $R_1$ is methyl, x is a number greater than 3 and less than 15, and y and z are each 0; said monomers being in a weight ratio of (i):(ii) of from 20:80 to 80:20.

3. The article of claim 1 wherein the monomers (i):(ii) are in a weight ratio of (i):(ii) of from 40:60 to 85:15.

4. The article of claim 1 wherein said polymerization initiator is a thermal polymerization initiator selected from peroxymonocarbonate esters, peroxydicarbonate esters, diacylperoxides, peroxyesters, methylethylketone peroxide, acetylcyclohexane sulfonyl peroxide, azobis (isobutyronitrile), 2,2'-azobis(2,4-dimethylpentanenitrile), 1,1'-azobiscyclohexanecarbonitrile, azobis(2,4-dimethylvaleronitrile) or mixtures of such initiators.

5. The article of claim 4 wherein said thermal polymerization initiator is 2,2'-azobis(2,4-dimethylpentanenitrile), 1,1'-azobiscyclohexanecarbonitrile or mixtures thereof.

6. The article of claim 1 wherein said polymerization initiator is a photoinitiator selected from acetophenones, α-aminoalkylphenones, benzoin ethers, benzoyl oximes, acylphosphine oxides, bisacylphosphine oxides or mixtures of such initiators.

7. The article of claim 1 wherein said polymerization initiator is a photoinitiator selected from benzophenone, Michler's ketone, thioxanthone, anthraquinone, camphorquinone, fluorone, ketocoumarin or mixtures of such initiators.

8. The article of claim 7 wherein said polymerization initiator further comprises a hydrogen donor material.

9. The article of claim 7 wherein said polymerization initiator further comprises a cationic photoinitiator.

10. The article of claim 1 wherein the photochromic component comprises:
  (a) at least one photochromic compound having a visible lambda max of from 400 nanometers to 525 nanometers; and
  (b) at least one photochromic compound having a visible lambda max of from greater than 525 nanometers to 700 nanometers.

11. The article of claim 10 wherein the photochromic compounds are benzopyrans, naphthopyrans, phenanthropyrans, quinopyrans, indeno-fused naphthopyrans, benzoxazines, naphthoxazines, spiro (indoline)pyridobenzoxazines, metal-dithizonates, fulgides, fulgimides or mixtures thereof.

12. The article of claim 1 wherein the cured coating has a thickness of from 1 to 200 microns.

13. The article of claim 12 wherein the thickness is from 10 to 100 microns.

14. The article of claim 1 wherein said substrate is paper, glass, ceramic, wood, masonry, textile, metal or polymeric organic material.

15. The article of claim 14 wherein the polymeric organic material is a solid transparent polymer selected from the group consisting of poly(methyl methacrylate), poly (ethylene glycol bismethacrylate), poly(ethoxylated bisphenol A dimethacrylate), thermoplastic polycarbonate, poly (vinyl acetate), polyvinylbutyral, polyurethane, polythiourethanes, and polymers of members of the group consisting of polymerizates of diethylene glycol bis(allyl carbonate) monomers, diethylene glycol dimethacrylate monomers, ethoxylated phenol methacrylate monomers, diisopropenyl benzene monomers, ethoxylated trimethylol propane triacrylate monomers and mixtures thereof.

16. The article of claim 15 wherein said substrate is an optical element.

17. The article of claim 16 wherein said optical element is a lens.

18. The article of claim 17 wherein the refractive index of said lens is from 1.48 to 2.00.

19. The article of claim 1 further comprising a primer interposed between the substrate and photochromic poly (meth)acrylic coating.

20. The article of claim 19 further comprising a protective coating applied to the surface of the photochromic poly (meth)acrylic coating.

21. An article comprising, in combination, an optical element having a primer on at least one surface of said element, a photochromic poly(meth)acrylic coating on said primer and a protective coating on the photochromic poly (meth)acrylic coating, said photochromic poly(meth)acrylic coating comprising a polymerizate of:
(a) at least two difunctional (meth)acrylate monomers selected from:
(i) a first monomer, represented by the following general formula:

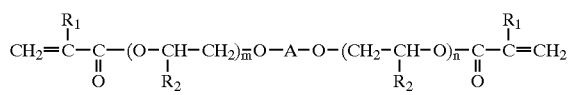

wherein each $R_1$ is hydrogen or methyl, each $R_2$ is hydrogen or $C_1$–$C_2$ alkyl, m and n are each a positive number, the sum of m and n being greater than 3 but less than 15, and A is a divalent linking group selected from the group consisting of straight or branched chain alkylene, phenylene, $C_1$–$C_9$ alkyl substituted phenylene, and a group represented by the following graphic formula:

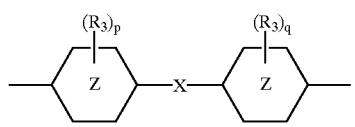

wherein, each $R_3$ is $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —CH=CH—, —C($CH_3$)$_2$—, —C($CH_3$)($C_6H_5$)— or

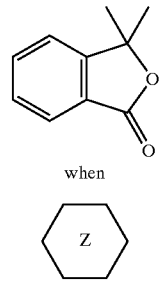

when

is the divalent benzene group, and X is O, S, —$CH_2$—, or —C($CH_3$)$_2$— when

is the divalent cyclohexane group; and
(ii) a second monomer represented by the following general formula:

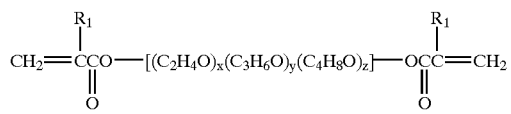

wherein each $R_1$ is hydrogen or methyl, x, y and z are each a number between 0 and less than 15 and the sum of x, y and z is greater than 3 and less than 15; said monomers being in a weight ratio of (i) to (ii) of from greater than 10:90 to less than 90:10;

(b) a photochromic amount of a photochromic component; and (c) from 0 to 10 weight percent, based on the total weight of monomers, of polymerization initiator selected from thermal initiators, photoinitiators or mixtures of such initiators, said coating being free of chain transfer agents and said components (a), (b) and (c) being used in such proportions to produce a photochromic poly (meth)acrylic coating having a Fischer microhardness of between 50 and 150 Newtons per $mm^2$, a $\Delta$OD at 30 seconds of at least 0.15 and at 15 minutes of at least 0.50, and a bleach rate of not more than 200 seconds— all as measured at 22° C. (72° F.).

22. The article of claim 21 wherein the monomers are in a weight ratio of (i):(ii) of from 30:70 to 70:30.

* * * * *